United States Patent
Chou et al.

(10) Patent No.: US 11,341,873 B2
(45) Date of Patent: May 24, 2022

(54) FOLDABLE DISPLAY DEVICE

(71) Applicant: InnoLux Corporation, Miao-Li County (TW)

(72) Inventors: Cheng-Hsu Chou, Miao-Li County (TW); Po-Han Huang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 13 days.

(21) Appl. No.: 16/920,767

(22) Filed: Jul. 6, 2020

(65) Prior Publication Data
US 2021/0027670 A1 Jan. 28, 2021

(30) Foreign Application Priority Data
Jul. 26, 2019 (CN) .......................... 201910683435.3

(51) Int. Cl.
*G09F 9/30* (2006.01)
*G06F 1/16* (2006.01)

(52) U.S. Cl.
CPC ............ *G09F 9/301* (2013.01); *G06F 1/1616* (2013.01); *G06F 1/1652* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,727,601 | B2 * | 5/2014 | Wang | G06F 1/1681 362/632 |
| 9,071,673 | B2 * | 6/2015 | Choi | H04M 1/0247 |
| 9,179,559 | B1 * | 11/2015 | Kim | H04M 1/0268 |
| 9,348,369 | B2 * | 5/2016 | Kee | G06F 1/1616 |
| 9,377,817 | B2 * | 6/2016 | Eguchi | H01L 29/7869 |
| 9,588,549 | B2 * | 3/2017 | Endo | G06F 3/0412 |
| 9,697,941 | B2 * | 7/2017 | Lee | G02F 1/13 |
| 9,720,455 | B2 * | 8/2017 | Jang | G06F 1/1641 |
| 9,801,290 | B2 * | 10/2017 | Ahn | G06F 1/1652 |
| 9,910,458 | B2 * | 3/2018 | Watanabe | G02F 1/133305 |
| 10,013,020 | B2 * | 7/2018 | Hong | G06F 1/1686 |
| 10,043,421 | B2 * | 8/2018 | Koo | G06F 1/1641 |
| 10,139,879 | B2 * | 11/2018 | Yamazaki | G06F 1/1635 |
| 10,244,088 | B2 * | 3/2019 | Kikuchi | G09G 3/3208 |
| 10,317,947 | B2 * | 6/2019 | Park | G06F 3/04842 |
| 10,416,950 | B2 * | 9/2019 | Kim | G02B 6/0078 |
| 10,491,724 | B2 * | 11/2019 | Lin | G06F 1/1616 |
| 10,599,378 | B2 * | 3/2020 | Choi | H05K 5/0217 |
| 10,664,013 | B2 * | 5/2020 | Jiang | G06F 1/1652 |

(Continued)

FOREIGN PATENT DOCUMENTS

CN 107221257 A 9/2017

*Primary Examiner* — Lisa Lea-Edmonds
(74) *Attorney, Agent, or Firm* — Winston Hsu

(57) ABSTRACT

A foldable display device includes a first panel having a first flat portion and a first bending portion at one side of the first flat portion. The first bending portion has a first bending axis around which the first bending portion rotates. The foldable display device also includes a second panel having a second flat portion and a second bending portion at one side of the second flat portion. The second bending portion has a second bending axis around which the second bending portion rotates. The first bending portion and the second bending portion are arranged adjacent to each other.

12 Claims, 10 Drawing Sheets

(56) References Cited

U.S. PATENT DOCUMENTS

| | | | |
|---|---|---|---|
| 10,965,796 B2* | 3/2021 | Yang | H04M 1/0268 |
| 11,048,300 B2* | 6/2021 | Delaporte | G06F 1/1616 |
| 11,076,495 B2* | 7/2021 | Cromer | H04M 1/0216 |
| 2015/0261259 A1* | 9/2015 | Endo | G06F 3/042 |
| | | | 361/679.06 |
| 2015/0286457 A1 | 10/2015 | Kim | |
| 2017/0102738 A1* | 4/2017 | Park | G06F 3/04842 |
| 2020/0364021 A1* | 11/2020 | Park | H04M 1/72516 |

* cited by examiner

FOLDABLE DISPLAY DEVICE

BACKGROUND OF THE DISCLOSURE

1. Field of the Disclosure

The present disclosure relates to a display device, and more particularly, to a foldable display device.

2. Description of the Prior Art

The planar display device has the advantageous of being lightweight and thin in thickness, and has gradually become the mainstream product in the display device market. The foldable display device has been raised in the field for the needs of easy to carry and a large display area.

However, in a conventional foldable display device, the electrical elements or material layers (such as electrodes, active layers of thin-film transistors (TFTs), and signal lines) near the folding areas may have a higher chance of being damaged by the stress generated from bending or folding of the display device. As a result, the display quality and performance of the thin film transistors of the foldable display device may be degraded. The stability and reliability of the foldable display device are also seriously influenced.

SUMMARY OF THE DISCLOSURE

One aspect of the present disclosure is to provide a foldable display device. The foldable display device includes a first panel and a second panel, and can be folded and unfolded. The foldable display device after splicing can have improved display quality.

In an embodiment of the present disclosure, a foldable display device is disclosed. The foldable display device includes a first panel having a first flat portion and a first bending portion at one side of the first flat portion, wherein the first bending portion has a first bending axis and the first bending portion is capable of rotating around the first bending axis. The foldable display device further includes a second panel having a second flat portion and a second bending portion at one side of the second flat portion, wherein the second bending portion has a second bending axis and the second bending portion is capable of rotating around the second bending axis. The first bending portion and the second bending portion are disposed adjacent to each other.

These and other objectives of the present disclosure will no doubt become obvious to those of ordinary skill in the art after reading the following detailed description of the embodiment that is illustrated in the various figures and drawings.

DETAILED DESCRIPTION

Figure 1:
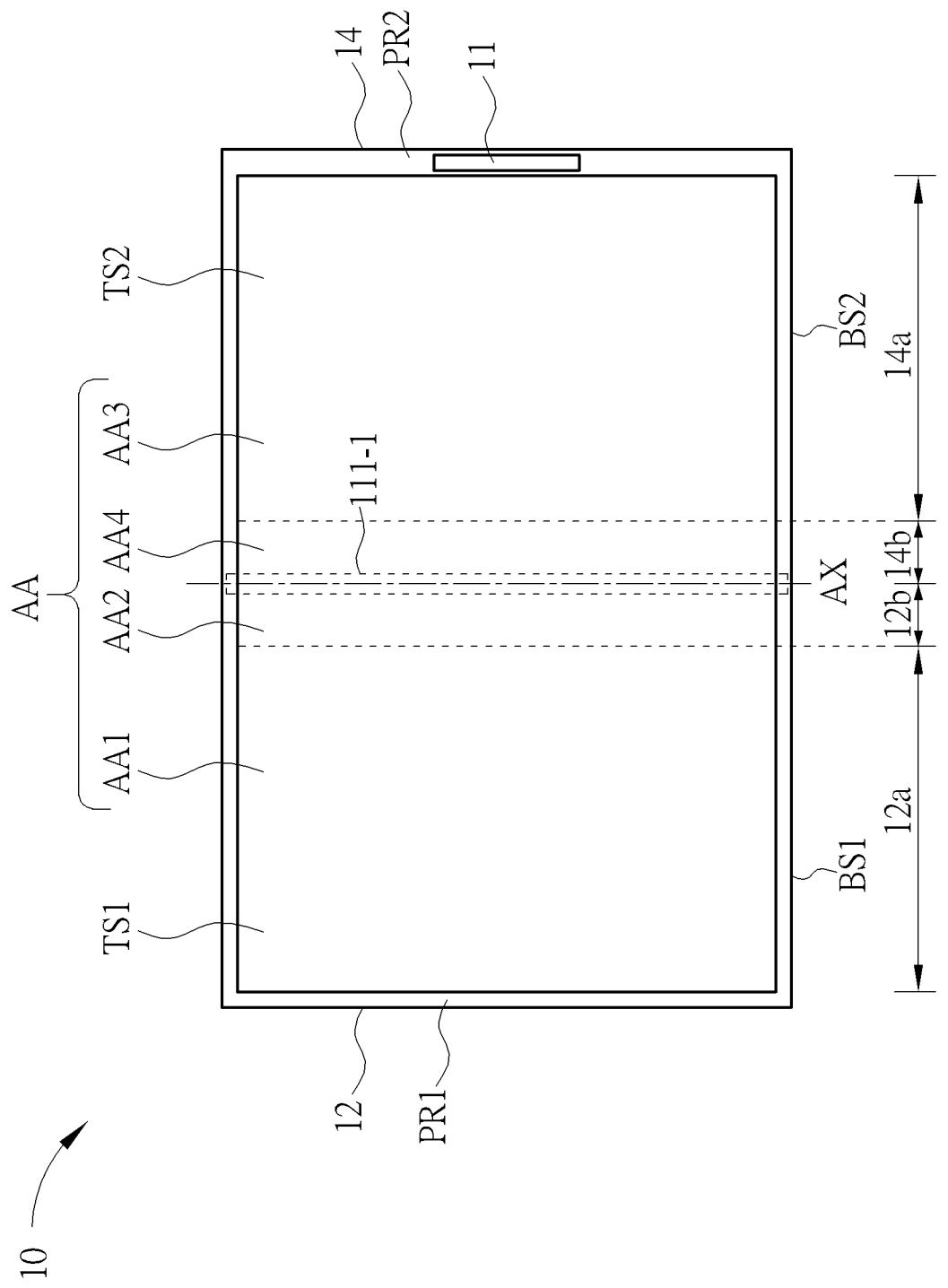
FIG. 1 is a schematic plan view of a foldable display device in an unfolded form according to an embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". It will be understood that when a component is referred to as being "connected to" another component (or its variant), it can be directly connected to the "another component", or connected to the another component through one or more intervening components.

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

Although the terms such as first, second, etc., may be used in the description and following claims to describe various components in claims, these terms doesn't mean or represent the claimed components have order and doesn't represent the order of one claimed component and another one claimed component, or the sequence in manufacturing method. These terms are used to discriminate a claimed component with a denomination from another one claimed component with the same denomination.

It should be noted that the technical features in different embodiments described in the following description can be replaced, recombined, or mixed with one another to constitute another embodiment without departing from the spirit of the present disclosure.

The foldable display device of the present disclosure may be a curved display device or a flexible display device, wherein the flexible display device includes those that may be transformed by being bent, warped, folded, stretched, flexed or other types of transforming operations, and are referred to as "foldable display devices" in the present disclosure. In other words, during operation, the display device may have a curved surface or be in a bent state.

Embodiments of the foldable display device disclosed herein may be a non-self-light-emitting liquid crystal display (liquid crystal display, LCD) or a self-light-emitting display. The self-light-emitting display can be organic light-emitting diode display (OLED display), inorganic light-emitting diode display (LED display), mini-LED display, micro-LED display, quantum-dot LED display (QLED display), electrophoretic display (EPD), or other types of displays that may show images and pictures, but not limited thereto.

FIG. 1 is a schematic top view of a foldable display device 10 in an unfolded form according to an embodiment of the present disclosure. The foldable display device 10 can be applied to various transformable electronic devices, such as mobile phones, mobile personal computers, antennas, lighting devices, electronic books, and electronic papers, but not limited to.

The foldable display device 10 shown in FIG. 1 includes at least a first panel 12 and a second panel 14 spliced (or tiled) on one side of the first panel 12 along a splicing line (or tiling line, connecting line) AX. In other words, the first panel 12 and the second panel 14 are respectively located on two sides of the splicing line AX. The first panel 12 includes a first flat portion 12a and a first bending portion 12b at on one side of the first flat portion 12a. The second panel 14 includes a second flat portion 14a and a second bending portion 14b at one side of the second flat portion 14a. The first bending portion 12b and the second bending portion 14b are disposed adjacent to each other, and the first bending portion 12b and the second bending portion 14b may be considered as being located between the first flat portion 12a and the second flat portion 14a.

The first panel 12 includes a display surface TS1. The first panel 12 includes a first display area AA1 and a second display area AA2 respectively corresponding to the first flat portion 12a and the first bending portion 12b. The second display area AA2 may also be considered to be located between the first display area AA1 and the splicing line AX. Optionally, the first panel 12 may further include a first peripheral area PR1 located at least one outer side of the first display area AA1 and the second display area AA2.

The second panel 14 includes a display surface TS2. The second display panel 14 includes a third display area AA3 and a fourth display area AA4 respectively corresponding to the second flat portion 14a and the second bending portion 14b. The fourth display area AA4 may also be considered to be located between the third display area AA3 and the splicing line AX. Optionally, the second panel 14 may further include a second peripheral area PR2 located at least one outer side of the third display area AA3 and the fourth display area AA4.

When the first panel 12 and the second panel 14 are unfolded and substantially on the same horizontal plane plan, the first display area AA1, the second display area AA2, the third display area AA4, and the fourth display area AA4 can be joined to constitute an expanded display area AA of the foldable display device 10. In some embodiments, the entire expanded display area AA may display one image. In other embodiments, the expanded display area AA may be divided into several portions to display different images according to design requirements. The expanded display area AA may provide other types of application and is not limited to the above. In other embodiments of the present disclosure, the foldable display device may include two or more display panels spliced together, and the display area may be non-rectangular. For example, the expanded display area of the foldable display device may be circle shape, and the display area of the two panels may be ½ circle shape.

A peripheral circuit device 11 can be disposed in the first peripheral area PR1 and/or the second peripheral area PR2 to control the operation of the display elements of the first panel 12 and/or the second panel 14. The peripheral circuit device 11 may include a driving device, a reset device, a compensation device, an initialization device, an operation control device, a lighting control device, a capacitor, an inductance, a power line, or a combination of the above, but not limited thereto. In some embodiments, the first peripheral area PR1 and/or the second peripheral area PR2 may be connected with a flexible printed circuit (FPC) board (not shown). In some embodiments, by arranging the peripheral circuit device on the flexible printed circuit board and bending the flexible printed circuit board toward the back surface BS of the first panel 12 and/or the second panel 14, the areas of the first peripheral area PR1 and/or the second peripheral area PR2 occupied by the peripheral circuit device may be reduced, so that the areas of the first peripheral area PR1 and/or the second peripheral area PR2 may be reduced.

Figure 2:
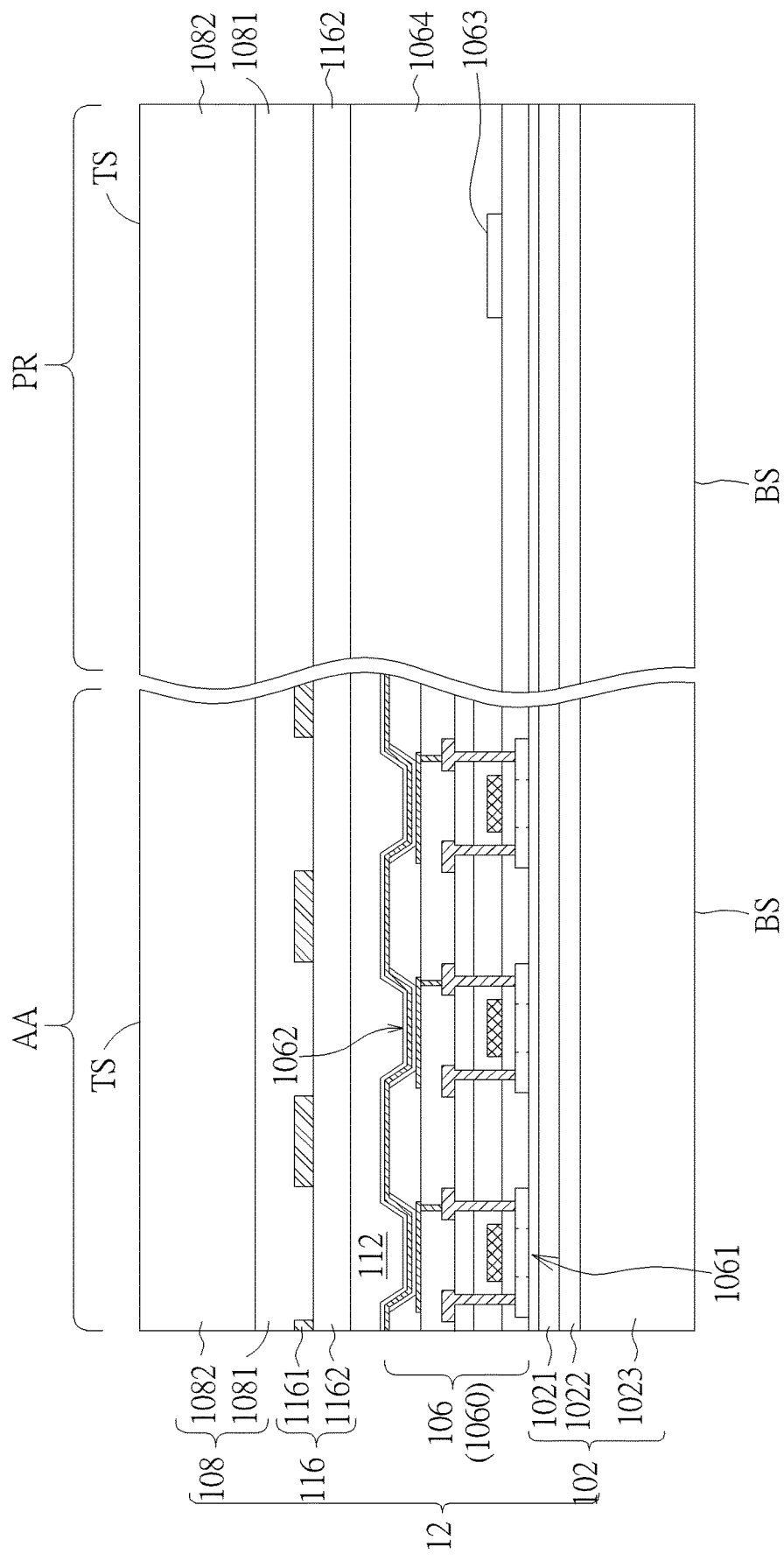
FIG. 2 is a schematic cross-sectional view of a display panel of the foldable display device according to an embodiment of the disclosure.

FIG. 2 is a schematic cross-sectional view of a display panel (such as the first panel 12 or the second panel 14) of the foldable display device 10 according to an embodiment of the disclosure. The left side of FIG. 2 is a schematic cross-sectional view of the display area AA of the display panel. The right side of FIG. 2 is a schematic cross-sectional view of the peripheral area PR of the display panel. The structure and configuration shown in FIG. 2 are only examples, and are not limitations of this disclosure. The first panel 12 and the second panel 14 of the foldable display device 10 may have the same or similar cross-sectional structures.

As shown on the left side of FIG. 2, the display panel may include a display surface TS and a back surface BS opposite to the display surface TS. The display panel may include a substrate 102, a display device layer 106, an encapsulation layer 112, a touch structure 116, and a protection layer 108, but is not limited thereto. The foregoing layers and elements may be selectively arranged depending on design requirements.

The substrate 102 may include a supporting layer 1023 and a flexible substrate 1021 attached to the supporting layer 1023 by an adhesive layer 1022. The supporting layer 1023 may be a substrate providing supporting function and may have good heat dissipation. The material of the supporting layer 1023 may include copper, iron, aluminum, or an alloy of these materials, but not limited thereto. The flexible substrate 1021 may include any suitable flexible or bendable material, such as polyimide (PI), polyethylene naphthalate (PEN), polyethylene terephthalate (PET) and other polymer materials or combinations thereof, but not limited to this. By attaching the flexible substrate 1021 to the supporting layer 1023 by the adhesive layer 1022, the structure and/or shape of the flexible substrate 1021 may be maintained.

The display device layer 106 is disposed on the flexible substrate 1021. The display device layer 106 may include a dielectric stack 1060 and a plurality of driving devices 1061 formed in the dielectric stack 1060 and a plurality of display units 1062 respectively corresponding to the driving devices

1061. The driving device 1061 may be, for example, a top-gate type thin film transistor (top-gate type TFT), but not limited thereto. In some embodiments, the driving device 1061 may also be a bottom-gate type thin film transistor (bottom-gate type TFT). The display unit 1062 may be any kind of display unit or device, such as organic light-emitting diode (OLED), micro-LED, mini-LED, or quantum dot light-emitting diode (QLED), but not limited thereto. In the embodiment shown in FIG. 2, the display unit 1062 may include, for example, an organic light emitting diode (OLED), which includes a bottom electrode, an upper electrode, and an organic light emitting layer interposed between the bottom electrode and the upper electrode. The bottom electrode of the display unit 1062 is electrically connected to a driving device 1061 so that the driving device 1061 may control the light emitting of the display unit 1062. In some embodiments, the display units 1062 of the display device layer 106 may include the same organic light-emitting material and thus emit light of the same color. In some embodiments, the display units 1062 may include different organic light-emitting materials that emit light with different colors. For example, some display units 1062 may include light-emitting material emitting red light, some display units 1062 may include light-emitting material emitting green light, and some display units 1062 may include light-emitting material emitting blue light. The region of the display device layer 106 having the display units 1062 is the light emitting region of the display panel. Light is emitted from the display device layer 106 and then passes through the encapsulation layer 112, the touch structure 116 and the protection layer 108 on the display device layer 106 to display the image on the display surface TS of the display panel.

The encapsulation layer 112 covers on the display device layer 106. The encapsulation layer 112 may be a thin film encapsulation (TFE) layer including organic-inorganic-organic stacked layers. The encapsulation layer 112 may protect the display device layer 106 from the moisture or oxygen in the environment and the display quality may be improved. The encapsulation layer 112 may include an organic material, an inorganic material, or a combination thereof, but not limited thereto.

In some embodiments, the display panel as shown in FIG. 2 may be a touch panel and can include a touch structure. As shown in FIG. 2, the touch structure 116 is disposed on the encapsulation layer 112. The touch structure 116 may provide a complete touch function or may provide touch assisting function, but not limited thereto. In one embodiment, the touch structure 116 may include a flexible substrate 1162 disposed on the encapsulation layer 112 and a touch layer 1161, such as a touch electrode, disposed on the flexible substrate 1162. In other embodiments, the touch layer may be directly disposed on the encapsulation layer 112 or may be integrated into the display device layer 106, depending on design requirements.

The protection layer 108 is disposed on the touch structure 116. In some embodiments, the protection layer 108 may include a polarizing layer 1081 and/or a cover layer 1082. The material of the polarizing layer 1081 may include polyvinyl alcohol (PVA) or other suitable materials. The material of the cover layer 1082 may include an inorganic material, an organic material, or a combination thereof. For example, the inorganic material may include glass. The organic material may include polyimide (PI), polyethylene naphthalate (PEN), polyethylene terephthalate (PET) or other polymer materials, or a combination thereof, but not limited thereto. The cover layer 1082 may provide protection and/or optical compensation to the display area of the display panel.

As shown on the right side of FIG. 2, in the peripheral area PR, the display panel also includes the substrate 102, the touch structure 116, and the protective layer 108. In some embodiments, in the peripheral area PR, a dielectric stack 1064 may be formed between the substrate 102 and the touch structure 116, and a peripheral circuit device 1063 may be formed in the dielectric stack 1064. In some embodiments, the structure and/or position of the peripheral circuit device 1063 may be adjusted according to design requirements as long as it is located between the protection layer 108 and the substrate 102. In some embodiments, the structure or position of the touch structure may be adjusted according to requirement. In some embodiments, the touch structure may be integrated in other layers, as long as being disposed between the protection layer 108 and the substrate 102. Optionally, the display device in some embodiments may further include a biometric identification layer for fingerprint identification and/or palm print identification, etc., for example. The biometric identification layer may be positioned on the back side of the display panel or integrated into the above-mentioned layers. The peripheral circuit device 1063 may include a driving device, a reset device, a compensation device, an initialization device, an operation control device, a lighting control device, a capacitor, an inductance, a power line, or a combination of the above, but not limited thereto. The dielectric stack 1064 may include a single-layer or multi-layer structure. In some embodiments, the dielectric stack 1064 may include the same material as the dielectric stack 1060 and/or the encapsulation layer 112 in the display area AA.

In some embodiments, the first display panel 12 and the second display panel 14 of the foldable display device of the present disclosure may respectively have the structure shown in FIG. 2. That is, the first panel 12 may include a first supporting layer (such as the supporting layer 1023), a first flexible substrate (such as the flexible substrate 1021) on the supporting layer, and a first display device layer (such as the display device layer 106) on the first flexible substrate. Similarly, the second panel 14 may include a second supporting layer (such as the supporting layer 1023), a second flexible substrate (such as the flexible substrate 1021) on the second supporting layer, and a second display device layer (such as the display device layer 106) on the second flexible substrate.

Figure 3:
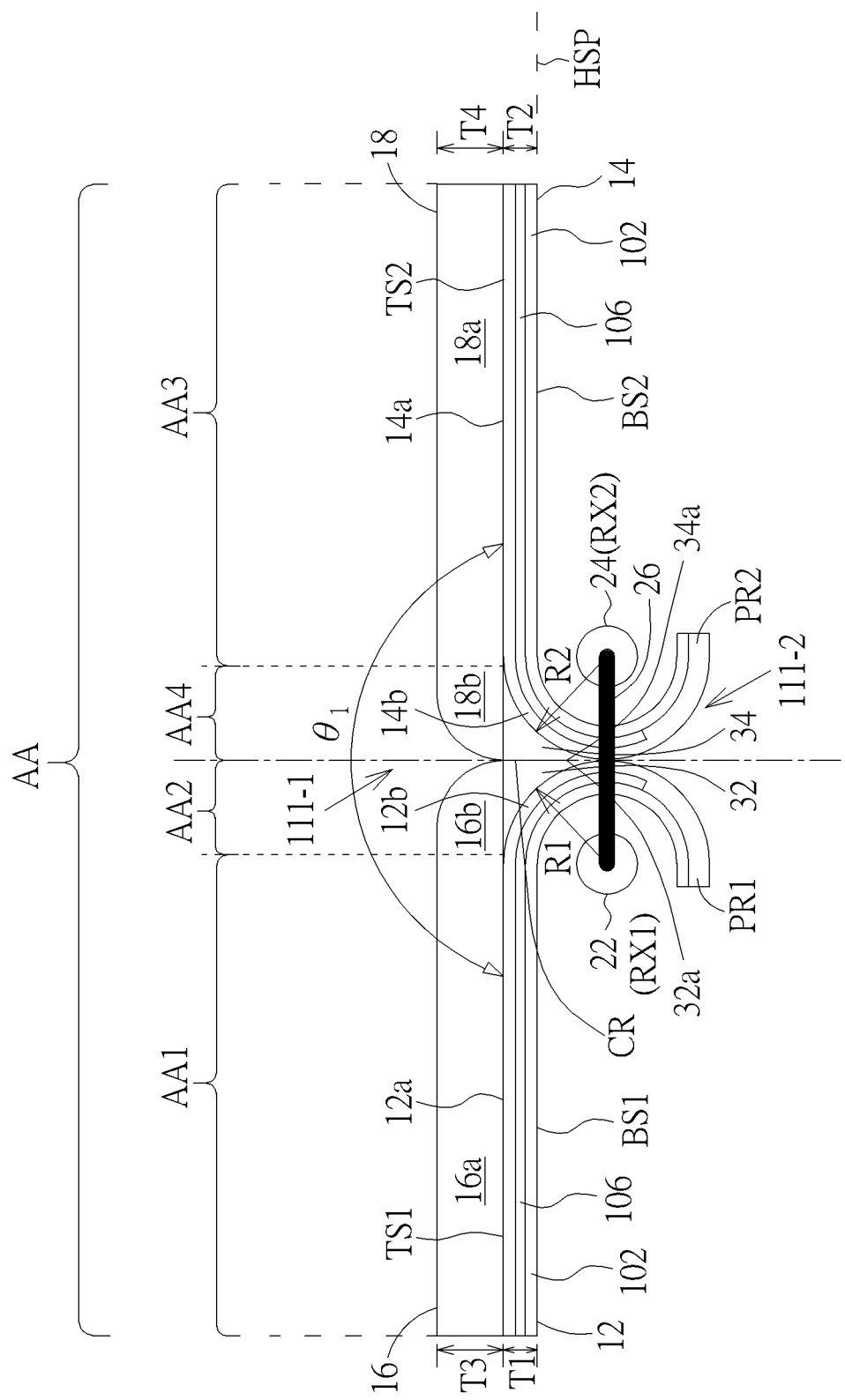
FIG. 3 is a partial cross-sectional view of a foldable display device in an unfolded form according to an embodiment of the present disclosure.

FIG. 3 is a partial cross-sectional view of a foldable display device 10 near the splicing line AX of the foldable display device 10 in an unfolded form according to an embodiment of the present disclosure. As shown in FIG. 3, the foldable display device 10 includes a first panel 12 and a second panel 14 spliced together on two sides of the splicing line AX. The first panel 12 and the second panel 14 may respectively include a multi-layer structure as shown in FIG. 2, including the supporting layer, the flexible substrate, the display device layer, the encapsulation layer and/or the touch layer, but not limited thereto. A first cover layer 16 may be disposed on the first panel 12. A second cover layer 18 may be disposed on the second panel 14. In order to simplify the illustration, in the first panel 12, only the flexible substrate 102 (the first flexible substrate) and the display device layer 106 are shown in FIG. 3. Similarly, in the second panel 14, only the flexible substrate 102 (second flexible substrate) and the display device layer 106 are shown in FIG. 3.

According to an embodiment of the disclosure, the foldable display device 10 includes a contact region CR substantially along the splicing line AX. The contact region CR is the region where the first panel 12 and the second panel 14 contact with each other and/or the region where structures (such as cover layers, light guiding bodies, etc.) disposed on the first panel 12 and the second panel 14 contact with each other. Furthermore, the contact region CR may be formed between different components of the foldable display device 10 depending on the structure or folding/unfolding forms of the foldable display device 10. However, the contact region CR between the first panel 12 and the second panel 14 substantially extend along the direction of the splicing line AX and may be a contact line or a contact surface.

According to some embodiments, the thickness T1 of the first panel 12 and the thickness T2 of the second panel 14 may be respectively between about 0.1 millimeters (mm) and 0.4 millimeters, but are not limited thereto. In some embodiments, the thickness T1 of the first panel 12 and the thickness T2 of the second panel 14 may be approximately equal. In other embodiments, the thickness T1 of the first panel 12 and the thickness T2 of the second panel 14 may not be equal.

The thickness T3 of the first cover layer 16 and the thickness T4 of the second cover layer 18 may be respectively between about 0.1 mm and 2 mm, but are not limited thereto. In some embodiments, the thickness T3 of the first cover layer 16 and the thickness T4 of the second cover layer 18 may be approximately equal. In other embodiments, the thickness T3 of the first cover layer 16 and the thickness T4 of the second cover layer 18 may not be equal.

As shown in FIG. 3, the first panel 12 includes a display surface TS1 and a back surface BS1 opposite to the display surface TS1. The portion of the first panel 12 extending between the display surface TS1 and the back surface BS1 may be divided into a first flat portion 12a and a first bending portion 12b adjoining the first flat portion 12a. Similarly, the second panel 14 includes a display surface TS2 and a back surface BS2 opposite to the display surface TS2. The portion of the second panel 14 extending between the display surface TS2 and the back surface BS2 may be divided into a second flat portion 14a and a second bending portion 14b adjoining the second flat portion 14a. The display surface TS1 of the first panel 12 has a first display area AA1 corresponding to the first flat portion 12a and a second display area AA2 corresponding to the first bending portion 12b. The display surface TS2 of the second panel 14 has a third display area AA3 corresponding to the second flat portion 14a and a fourth display area AA4 corresponding to the second bending portion 14b.

When the first panel 12 and the second panel 14 are in an unfolded form, the first flat portion 12a and the second flat portion 14a are generally on the same horizontal plane HSP, that is, aligned to the horizontal plane HSP. When the included angle θ1 between the display surface TS1 and the display surface TS2 is approximately 180±10 degrees (or between approximately 170 degrees and 190 degrees), the second display area AA2 of the first panel 12 and the fourth display area AA4 of the second panel 14 are joined, so that the first display area AA1, the second display area AA2, the third display area AA3, and the fourth display area AA4 may collectively constitute an expanded display area AA that is able to display an image. In other embodiments, the first display area AA1 and the second display area AA2 of the first panel 12 may be used as a primary display area displaying a primary image, while the third display area AA3 and the fourth display area AA4 of the second panel 14 may be used as an assistant display area displaying another image for reference simultaneously.

The first bending portion 12b has a first bending axis RX1 around which the first bending portion 12b rotates. The second bending portion 14b has a second bending axis RX2 around which the second bending portion 14b rotates. In some embodiments, the first bending portion 12b and the second bending portion 14b are disposed between the first bending axis RX1 and the second bending axis RX2. The foldable display device 10 may further include a connecting element 26 which connects or fixes the first bending portion 12b and the second bending portion 14b so that the first bending portion 12b and the second bending portion 14b may be disposed oppositely and between the first flat portion 12a and the second flat portion 14a. In some embodiments, a first axis assembly 22 is disposed near the back surface BS1 of the first panel 12 and close to the splicing line AX. The first axis assembly 22 may overlap the first bending axis RX1, and the first bending portion 12b may bend toward the back surface BS1 of the first panel 12 in a manner of surrounding the first axis assembly 22. In some embodiments, the first bending portion 12b may bend toward the back surface BS1 in a constant curvature radius R1. In other embodiments, the first bending portion 12b may bend toward the back surface BS1 in gradually changed curvatures. Similarly, a second axis assembly 24 is disposed near the back surface BS2 of the second panel 14 and close to the splicing line AX. The second axis assembly 24 may overlap the second bending axis RX2, and the second bending portion 14b may bend toward the back surface BS2 of the second panel 12 in a manner of surrounding the second axis assembly 24. In some embodiments, the second bending portion 14b may bend toward the back surface BS2 in a constant curvature radius R2. In other embodiments, the second bending portion 14b may bend toward the back surface BS2 in gradually changed curvatures. In some embodiments, the radius R1 and the radius R2 may be between 0.5 mm and 5 mm, respectively, but are not limited thereto. In some embodiments, the radius R1 and the radius R2 can be equal. The first axis assembly 22 and the second axis assembly 24 are disposed adjacent to each other with a gap therebetween and are joined together by the connecting element 26. The connecting element 26 may extend from one side of the first bending portion 12b through the first bending portion 12b and the second bending portion 14b to one side of the second bending portion 14b to connect the first axis assembly 22 and the second axis assembly 24.

Figure 4:
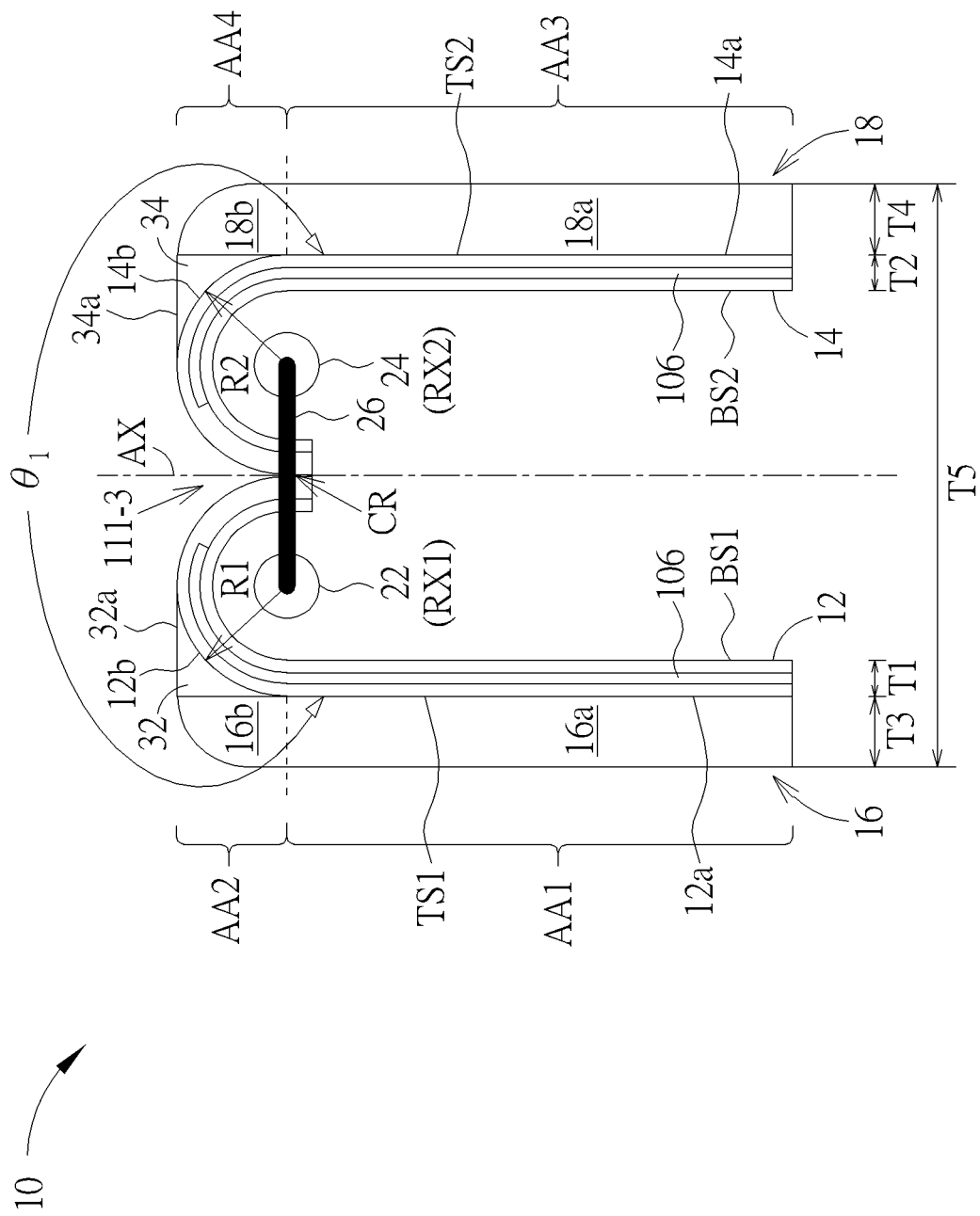
FIG. 4 is partial cross-sectional view of a foldable display device in a folded form according to an embodiment of the present disclosure.
Figure 5:
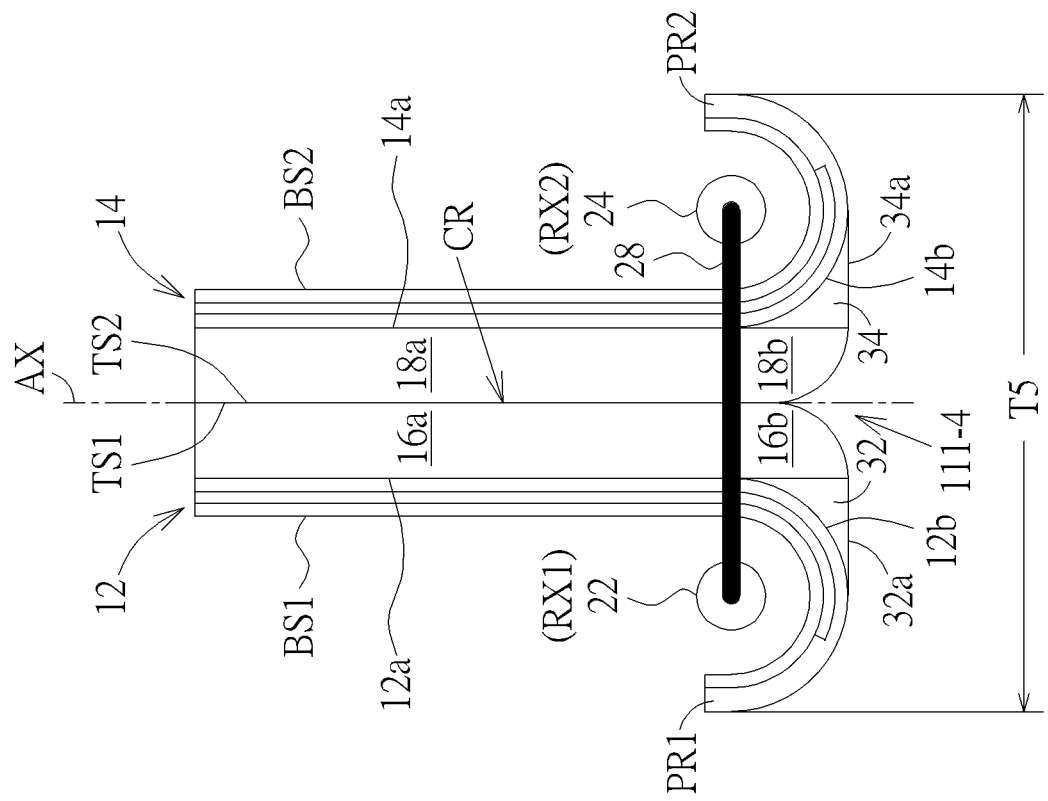
FIG. 5 is partial cross-sectional view of a foldable display device in a folded form according to an embodiment of the present disclosure.

The first bending portion 12b of the first panel 12 and the second bending portion 14b of the second panel 14 are disposed adjacent to each other and simultaneously pass through the gap between the first axis assembly 22 and the second axis assembly 24. In this way, when the first bending portion 12b rotates around the first axis assembly 22 and/or when the second bending portion 14b rotates around the second axis assembly 24, the relative position of the first flat portion 12a of the first panel 12 and the second flat portion 14a of the second panel 14 may be changed between the unfolded form as shown in FIG. 3 and the folded form as shown in FIG. 4 or FIG. 5. In an embodiment when the first panel 12 and the second panel 14 of the foldable display device 10 are unfolded as shown in FIG. 3, the first bending portion 12b of the first panel 12 and the second bending portion 14b of the second panel 14 may contact with each other on the contact region CR. According to an embodiment of the disclosure, a line between the first bending axis RX1 and the second bending axis RX2 will substantially pass through the contact region CR.

In some embodiments, a portion of the first bending portion 12*b* passing through the gap between the first axis assembly 22 and the second axis assembly 24 may include a first peripheral area PR1. A portion of the second bending portion 14*b* passing through the gap between the first axis assembly 22 and the second axis assembly 24 may include a second peripheral area PR2. In the first peripheral area PR1 and/or the second peripheral area PR2, peripheral circuit devices (not shown) can be disposed, for example, the peripheral circuit devices may include driving devices, reset devices, compensation devices, initialization devices, operation control devices, lighting control devices, capacitors, inductances, power lines, or a combination of the above, but not limited thereto. In some embodiments, a flexible printed circuit board (not shown) may be bonded to the first peripheral area PR1 and/or the second peripheral area PR2 to provide additional regions for accommodating the peripheral circuit devices. In some embodiments, the flexible printed circuit board may be used to electrically connect a printed circuit board (not shown) disposed on the back surface BS1 of the first panel 12 and/or the back surface BS2 of the second panel 14.

Please refer to FIG. 3. In some embodiments, a portion of the first cover layer 16 disposed on the first panel 12 may have a curved structure. For example, the first cover layer 16 may include a planar portion 16*a* corresponding to the first display area AA1 and a curved portion 16*b* corresponding to the second display area AA2. A portion of the second cover layer 18 disposed on the second panel 14 may have a curved structure. For example, the second cover layer 18 may include a planar portion 18*a* corresponding to the third display area AA3 and a curved portion 18*b* corresponding to the fourth display area AA4. The curved portion 16*b* and the curved portion 18*b* may provide optical compensation to the first bending portion 12*b* and the second bending portion 14*b*, so that the image distortion shown in the second display area AA2 and the fourth display area AA4 may be reduced. Thus, the display quality can be improved. Furthermore, the display device provided by the present disclosure may utilize image processing algorithms to provide optical compensation according to the designs of the first bending portion 12*b* and the second bending portion 14*b*, and the display quality may be further improved. When the first panel 12 and the second panel 14 of the foldable display device 10 are unfolded as shown in FIG. 3, the edges of the curved portion 16*b* of the first cover layer 16 and the curved portion 18*b* of the second cover layer 18 may contact on the contact region CR to reduce a gap that may be observed between the second display area AA2 of the first panel 12 and the fourth display area AA4 of the second panel 14. In some embodiments, the materials of the first cover layer 16 and the second cover layer 18 may include glass, but not limited thereto.

According to an embodiment of the present disclosure, when the first panel 12 and the second panel 14 of the foldable display device 10 are unfolded as shown in FIG. 3, the curved portion 16*b* of the first cover layer 16 and the curved portion 18*b* of the second cover layer 18 may form a recess 111-1, which is on the same side as the display surface TS1 and the display surface TS2. According to an embodiment of the present disclosure, the first bending portion 12*b* of the first panel 12 and the second bending portion 14*b* of the second panel 14 may form another recess 111-2, which is on the different side from the display surface TS1 and the display surface TS2, and is opposite to the recess 111-1. According to an embodiment of the present disclosure, the splicing line AX is through the centers of the recess 111-1 and the recess 111-2. With the design of the recess 111-1 and the recess 111-2, the first panel 12 and the second panel 14 may be relatively rotated in different ways to facilitate the usage of the display device 10. For example, in the embodiment shown in FIG. 4, the foldable display device 10 may be folded in a manner that the display surface TS1 of the first panel 12 is moved to face away from the display surface TS2 of the second panel 14. In the embodiment shown in FIG. 5, the foldable display device 10 may be folded in a manner that the display surface TS1 of the first panel 12 is moved to face toward the display surface TS2 of the second panel 14. In the embodiment shown in FIG. 3, the recess 111-1 is formed by the curved portion 16*b* of the first cover layer 16 and the curved portion 18*b* of the second cover layer 18. Furthermore, in the top view direction, the recess 111-1 is located between the second display area AA2 of the first panel 12 and the fourth display area AA4 of the second panel 14 adjacent to the first panel 12. The recess 111-2 is formed by the first bending portion 12*b* of the first panel 12 and the second bending portion 14*b* of the second panel 14, and is opposite to the recess 111-1. Optionally, the display device provided by the present disclosure may utilize image-processing algorithms corresponding to the design of the recess 111-1 to enhance the optical compensation effect and further improve the display quality.

In some embodiments, a first light guiding body 32 may be optionally disposed between the bottom surface of the curved portion 16*b* of the first cover layer 16 and the first bending portion 12*b* of the first panel 12. A second light guiding body 34 may be optionally disposed between the bottom surface of the curved portion 18*b* of the second cover layer 18 and the second bending portion 14*b* of the second panel 14. The materials of the first light guiding body 32 and the second light guiding body 34 may be transparent polymers, such as polymethyl methacrylate (PMMA), but not limited thereto. The first light guiding body 32 and the second light guiding body 34 may be designed to match the curved portion 16*b* and the curved portion 18*b*, respectively. The image distortion shown in the second display area AA2 and the fourth display area AA4 caused by the first bending portion 12*b* and the second bending portion 14*b* may be further reduced by additional optical compensation provided by the first light guiding body 32 and the second light guiding body 34. Therefore, the sense of image discontinuity or splicing boundary may be diminished even the recess 111-1 is formed in the viewer-side. As shown in FIG. 3, when the first panel 12 and the second panel 14 are unfolded, the sidewall 32*a* of the first light guiding body 32 and the sidewall 34*a* of the second light guiding body 34 may contact with each other so that the sense of image discontinuity or splicing boundary between the second display area AA2 of the first panel 12 and the fourth display area AA4 of the adjacent second panel 14 may be further diminished and the display quality may be improved. Furthermore, with a proper design of the first light guiding body 32 and the second light guiding body 34 and corresponding image processing algorithms, the optical compensation may be more enhanced and the display quality may be further improved.

In some embodiments, the display device layer 106 of the first panel 12 and/or the display device layer 106 of the second panel 14 may extend into at least a portion of the first bent portion 12*b* and/or at least a portion of the second bent portion 14*b* and optionally may extend to reach the contact region CR of the foldable display device 10 so that the margin of the optical compensation from the cover layer 16 and the cover layer 18 may be increased. In the embodiment shown in FIG. 3 that the foldable display device 10 is unfolded, the contact region CR is formed by the first light guiding body 32 and the second light guiding body 34 and may be a contact line or a contact surface depending upon the design of the first light guiding body 32 and the second light guiding body 34.

FIG. 4 is partial cross-sectional view of a foldable display device 10 in a folded form according to an embodiment of the present disclosure. The foldable display device 10 may be folded outwardly by relatively rotating the first panel 12 and the second panel 14 around the first axis assembly 22 and the second axis assembly 24 in a direction of increasing the included angle $\theta 1$ between the display surface TS1 and the display surface TS2 until the included angle $\theta 1$ is approximately 360±10 degrees (between 350 and 370 degrees) and so that the display surface TS1 faces away from the display surface TS2. As shown in FIG. 4, the back surface BS1 of the first panel 12 faces the back surface BS2 of the second panel 14. The first display area AA1 and the second display area AA2 of the first panel 12 face to different outer sides from the third display area AA3 and the fourth display area AA4 of the second panel 14 of the display device 10. In other words, the first display area AA1 of the first panel 12 is positioned on the side opposite to the side of the first panel 12 adjacent to the connecting element 26. The third display area AA3 of the second panel 14 is positioned on the side opposite to the side of the second panel 14 adjacent to the connecting element 26.

In an embodiment when the first panel 12 and the second panel 14 of the foldable display device 10 are folded as shown in FIG. 4, a recess 111-3 is formed by the first bending portion 12*b* and the second bending portion 14*b*. The splicing line AX is through the center of the recess 111-3.

FIG. 5 is partial cross-sectional view of a foldable display device 10 in a folded form according to an embodiment of the present disclosure. The difference between FIG. 4 and FIG. 5 is that, the foldable display device 10 is folded inwardly by relatively rotating the first panel 12 and the second panel 14 around the first axis assembly 22 and the second axis assembly 24 in a direction of decreasing the included angle $\theta 1$ between the display surface TS1 and the display surface TS2 until the absolute value of the included angle $\theta 1$ is approximately between 0 and 10 degrees and so that the display surface TS1 faces the display surface TS2. The first display area AA1 and the second display area AA2 of the first panel 12 and the third display area AA3 and the fourth display area AA4 of the second panel 14 are positioned inside the display device 10. That is, the first cover layer 16 and the second cover layer 18 are located between the first panel 12 and the second panel 14. According to an embodiment, the first cover layer 16 and the second cover layer 18 may contact with each other in the contact area CR of the foldable display device 10. A recess 111-4 may be formed by the curved portions of the first cover layer 16 and the second cover layer 18, and the splicing line AX is through the center of the recess 111-4. In FIG. 5, the recess 111-4 is formed by the curved portion 16*b* of the first cover layer 16 and the curved portion 18*b* of the second cover layer 18. The foldable display device 10 may further include a connecting element 28 that connects or fixes the first bending portion 12*b* and the second bending portion 14*b* so that the first bending portion 12*b* and the second bending portion 14*b* may be configured opposite to each other and between the first flat portion 12*a* and the second flat portion 14*a*. The connecting element 28 of the foldable display device 10 in this embodiment allows the distance between the first axis assembly 22 and the second axis assembly 24 changing properly so that the first panel 12 and the second panel 14 may be folded or unfolded smoothly.

The thickness T5 of the foldable display device 10 in the folded form shown in FIG. 4 or FIG. 5 is determined by the thickness T1 of the first panel 12, the thickness T2 of the second panel 14, the thickness T3 of the first cover layer 16, the thickness T4 of the second cover layer 18, the radius R1 of the first bending portion 12*b* of the first panel 12 and the radius R2 of the second bending portion 14*b* of the second panel 14. If the first light guiding body 32 and the second light guiding body 34 are provided in the foldable display device 10, they would be distanced apart when the foldable display device 10 is folded as shown in FIG. 4 or FIG. 5, and the sidewall 32*a* of the first light guiding body 32 and the sidewall 34*a* of the second light guiding body 34 would be exposed.

One feature of the present disclosure is that the foldable display device is changed between the folded form and the unfolded form by rotating the first panel around the first bending axis (the first axis assembly 22) and rotating the second panel around the second bending axis (the second axis assembly 24), respectively. In this way, defects caused by repeatedly folding or bending the first panel itself and/or the second panel itself may be reduced. Therefore, the foldable display device provided by the present disclosure may have improved stability and reliability.

Figure 6:
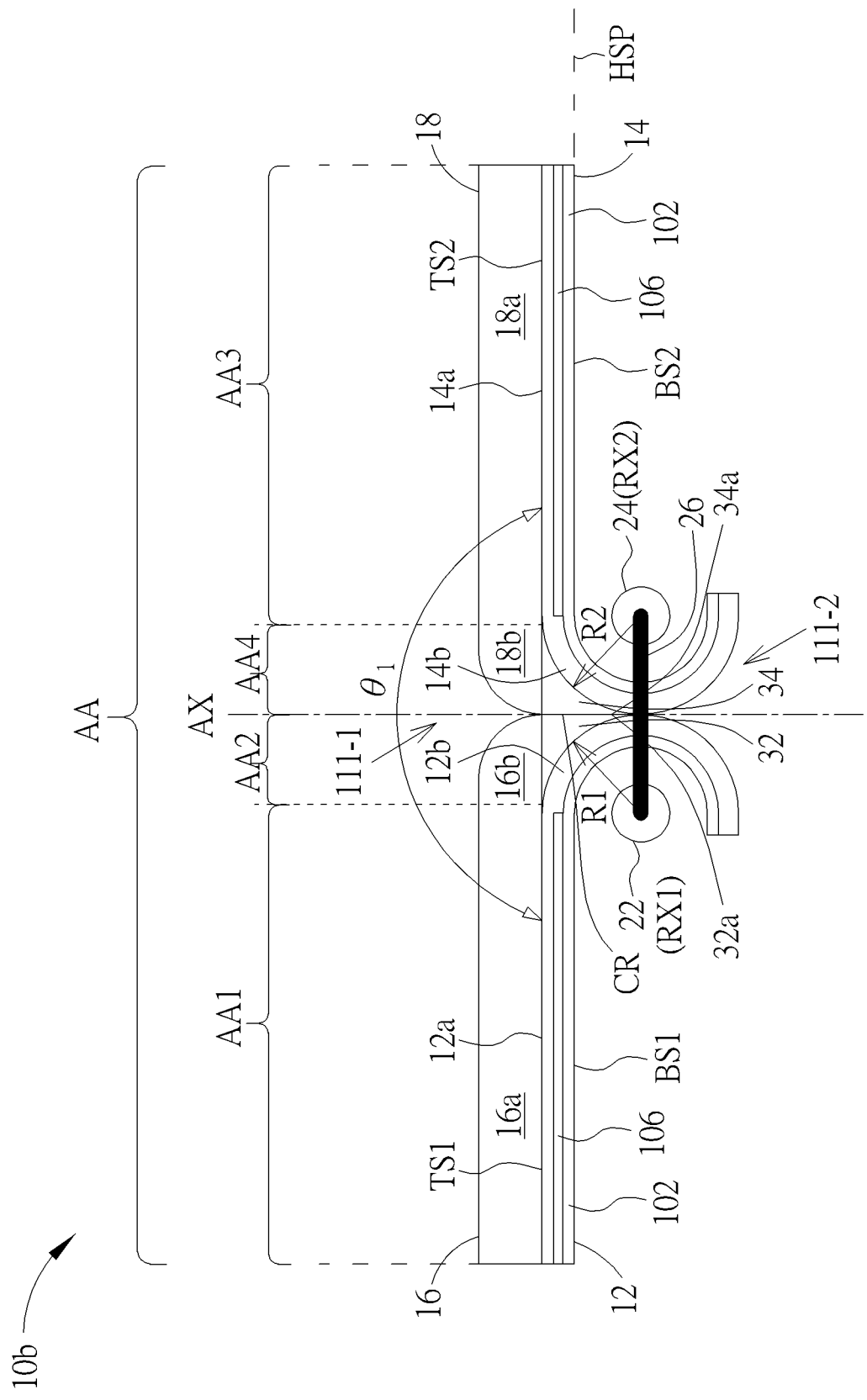
FIG. 6 is a partial cross-sectional view of a foldable display device in an unfolded form according to an embodiment of the present disclosure.

FIG. 6 is a partial cross-sectional view of a foldable display device 10*b* in an unfolded form according to an embodiment of the present disclosure, which differs from previous embodiments shown in FIG. 3 in that, as shown in FIG. 6, the display device layer 106 of the first panel 12 may be optionally formed in the first flat portion 12*a* of the first panel 12 without extending into the first bending portion 12*b*, and the display device layer 106 of the second panel 14 may be optionally formed in the second flat portion 14*a* of the second panel 14 without extending into the second bending portion 14*b*. In the embodiment, a portion of the light emitted from the first display area AA1 and the third display area AA3 may penetrate through the curved portion 16*b* of the first cover layer 16 and the curved portion 18*b* of the second cover layer 18 for displaying images in the second display area AA2 and the fourth display area AA4. Similarly, a first light guiding body 32 may be optionally disposed between the bottom surface of the curved portion 16*b* of the first cover layer 16 and the first bending portion 12*b* of the first panel 12, and a second light guiding body 34 may be optionally disposed between the bottom surface of the curved portion 18*b* of the second cover layer 18 and the second bending portion 14*b* of the second panel 14. The first light guiding body 32 and the second light guiding body 34 may provide additional optical compensation to further reduce the sense of splicing boundary. Optionally, the display device provided by the present disclosure may utilize image processing algorithms corresponding to the position of the display device layer 106 and the designs of the first light guiding body 32 and the second light guiding body 34 to enhance the optical compensation and further improve the display quality.

Figure 7:
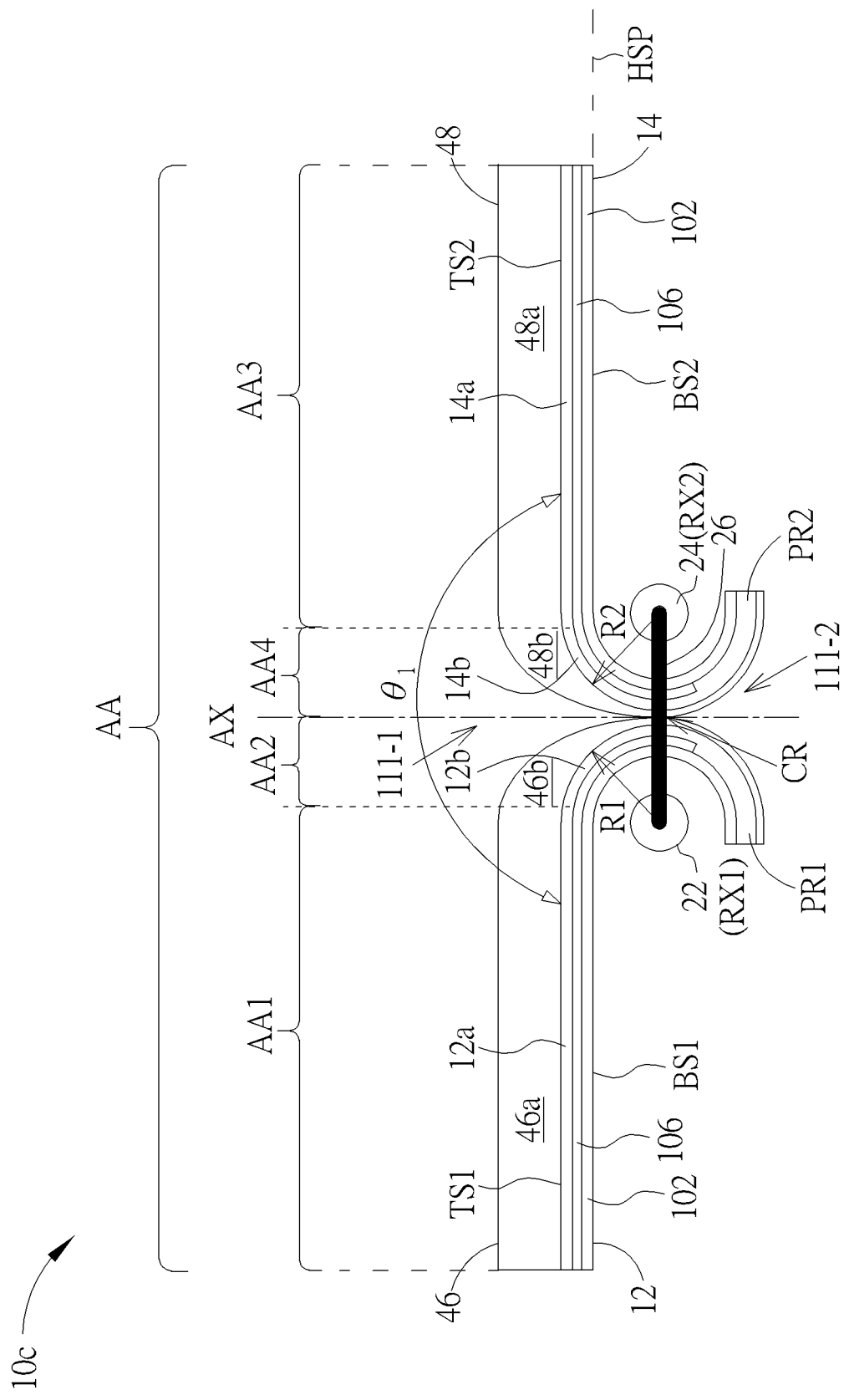
FIG. 7 is a partial cross-sectional view of a foldable display device in an unfolded form according to an embodiment of the present disclosure.
Figure 8:
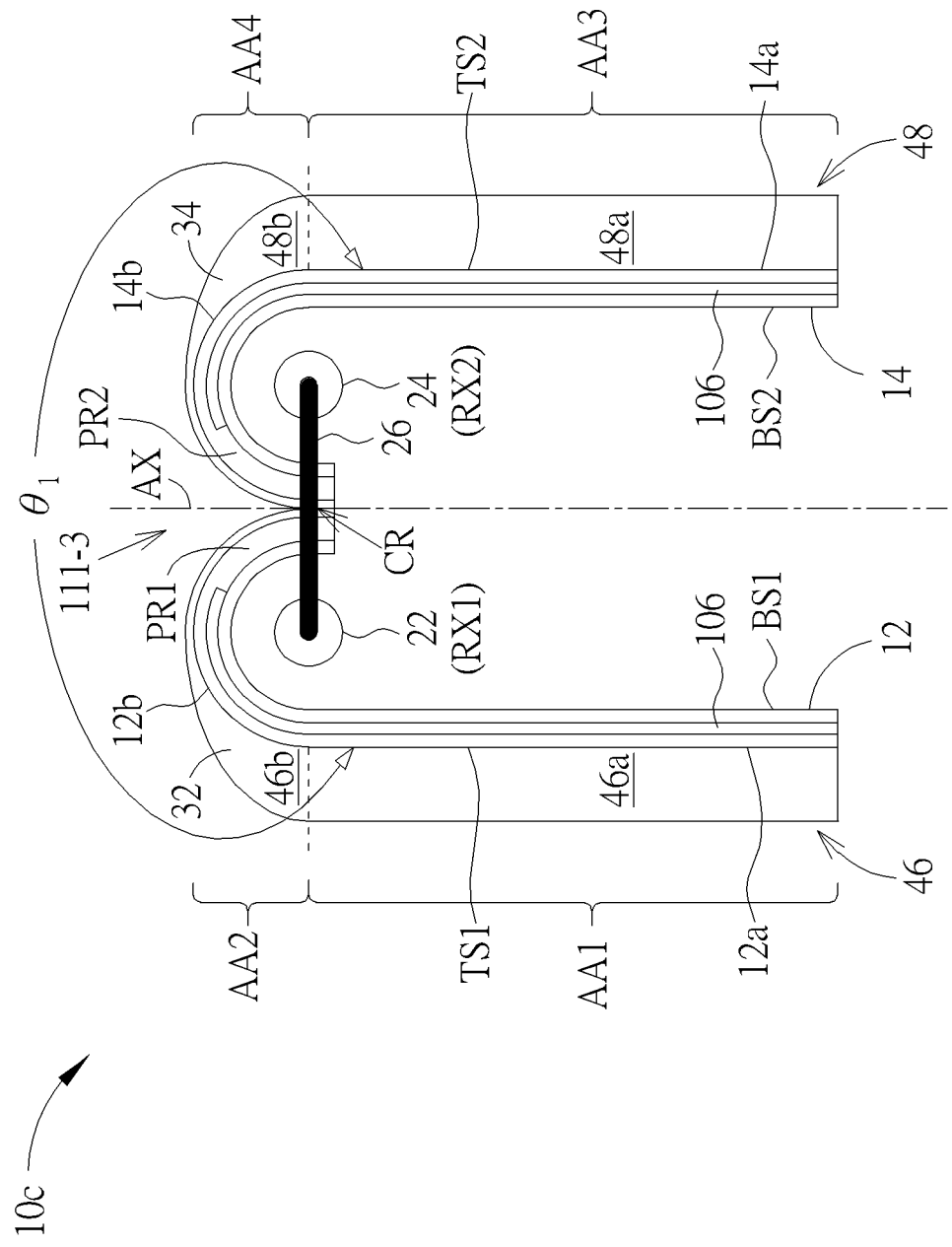
FIG. 8 is partial cross-sectional view of a foldable display device in a folded form according to an embodiment of the present disclosure.
Figure 9:
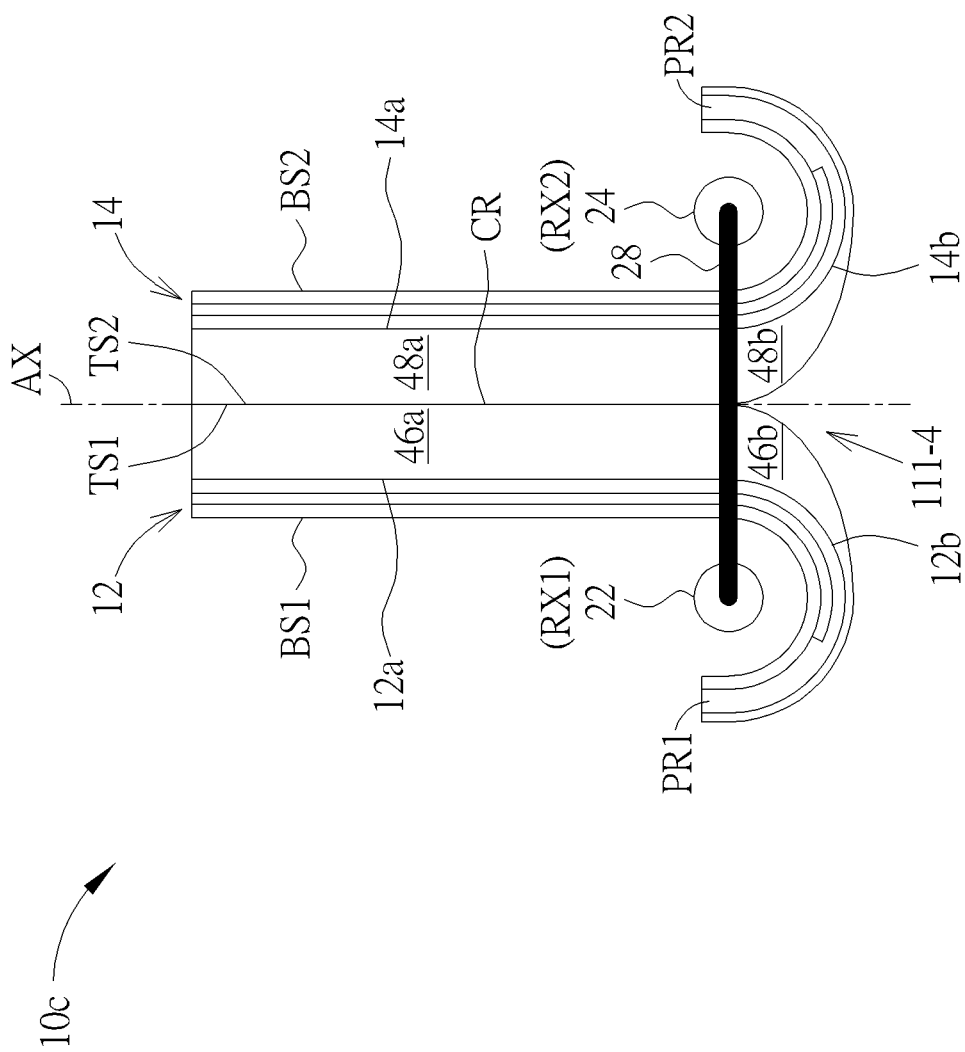
FIG. 9 is partial cross-sectional view of a foldable display device in a folded form according to an embodiment of the present disclosure.

FIG. 7, FIG. 8 and FIG. 9 are partial cross-sectional views of a foldable display device 10*c* in unfolded or folded forms according to an embodiment of the present disclosure, which differs from previously embodiments shown in FIG. 3, FIG. 4 and FIG. 5 in the first cover layer 46 and the second cover layer 48 with curved portions. As shown in FIG. 7, the first cover layer 46 includes a planar portion 46a covering along the first flat portion 12a of the first panel 12 and a curved portion 46b covering along the first bending portion 12b of the first panel 12. The second cover layer 48 includes a planar portion 48a covering along the second flat portion 14a of the second panel 14 and a curved portion 48b covering along the second bending portion 14b of the second panel 14. Optionally, according to an embodiment of the present disclosure, the curved portion 46b of the first cover layer 46 may extend to cover at least part of the first peripheral region PR1 of the first panel 12, and the curved portion 48b of the second cover layer 48 may extend to cover at least part of the second peripheral area PR2 of the second panel 14.

FIG. 7 is a partial cross-sectional view of a foldable display device 10c in an unfolded form. As shown in FIG. 7, the first flat portion 12a of the first panel 12 and the second flat portion 14a of the second panel 14 are substantially on a same horizontal plane HSP, or the included angle θ1 between the display surface TS1 and the display surface TS2 is approximately 180±10 degrees (or between approximately 170 degrees and 190 degrees). The curved portion 46b of the first cover layer 46 and the curved portion 48b of the second cover layer 48 may contact with each other on the contact region CR. The contact region CR in the embodiment shown in FIG. 7 is formed by the curved portion 46b of the first cover layer 46 and the curved portion 48b of the second cover layer 48, which may be a contact line or a contact surface depending upon the designs of the curved portions.

FIG. 8 is a partial cross-sectional view of a foldable display device 10c in a folded form. As shown in FIG. 8, the first panel 12 and the second panel 14 are relatively rotated around the first axis assembly 22 and the second axis assembly 24 in a direction of increasing the included angle θ1 between the display surface TS1 and the display surface TS2 until the included angle θ1 is approximately 360±10 degrees (between 350 and 370 degrees) and so that the display surface TS1 is moved to face away from the display surface TS2. In the folded form shown in FIG. 8, the first display area AA1 and the second display area AA2 of the first panel 12 face to different outer sides from the third display area AA3 and the fourth display area AA4 of the second panel 14 respectively. The back surface BS1 of the first panel 12 faces the back surface BS2 of the second panel 14. In the embodiment of FIG. 8, the recess 111-3 is formed by the curved portion 46b of the first cover layer 46 and the curved portion 48b of the second cover layer 48.

FIG. 9 is a partial cross-sectional view of a foldable display device 10c in another folded form. As shown in FIG. 9, the first panel 12 and the second panel 14 are relatively rotated around the first axis assembly 22 and the second axis assembly 24 in a direction of decreasing the included angle θ1 between the display surface TS1 and the display surface TS2 until the absolute value of the included angle θ1 is approximately between 0 and 10 degrees and so that the display surface TS1 faces the display surface TS2. In the folded form shown in FIG. 9, the first display area AA1 and the second display area AA2 of the first panel 12 and the third display area AA3 and the fourth display area AA4 of the second panel 14 are positioned inside the display device 10c. The foldable display device 10c may include a connecting element 28, which allows the distance between the first axis assembly 22 and the second axis assembly 24 to change properly so that the first panel 12 and the second panel 14 may be folded or unfolded smoothly. The recess 111-4 is formed by the curved portion 46b of the first cover layer 46 and the curved portion 48b of the second cover layer 48.

The display device 10c shown in FIG. 7, FIG. 8 and FIG. 9 have the first bending portion 12b and the second bending portion 14b being covered by the curved portion 46b of the first covering layer 46 and the curved portion 48b of the second covering layer 48. Whenever the display device 10c is folded inwardly or outwardly, changing between the folded form and the unfolded form can be performed by the manner that the curved portion 46b and the curved portion 48b contact with each other continuously or in a tangential manner. Thus, the display device 10c may be folded and unfolded smoothly. In addition, the second display region AA2 and the fourth display region AA4 can have better image compensation effect, and the perception of image discontinuity can be reduced.

Figure 10:
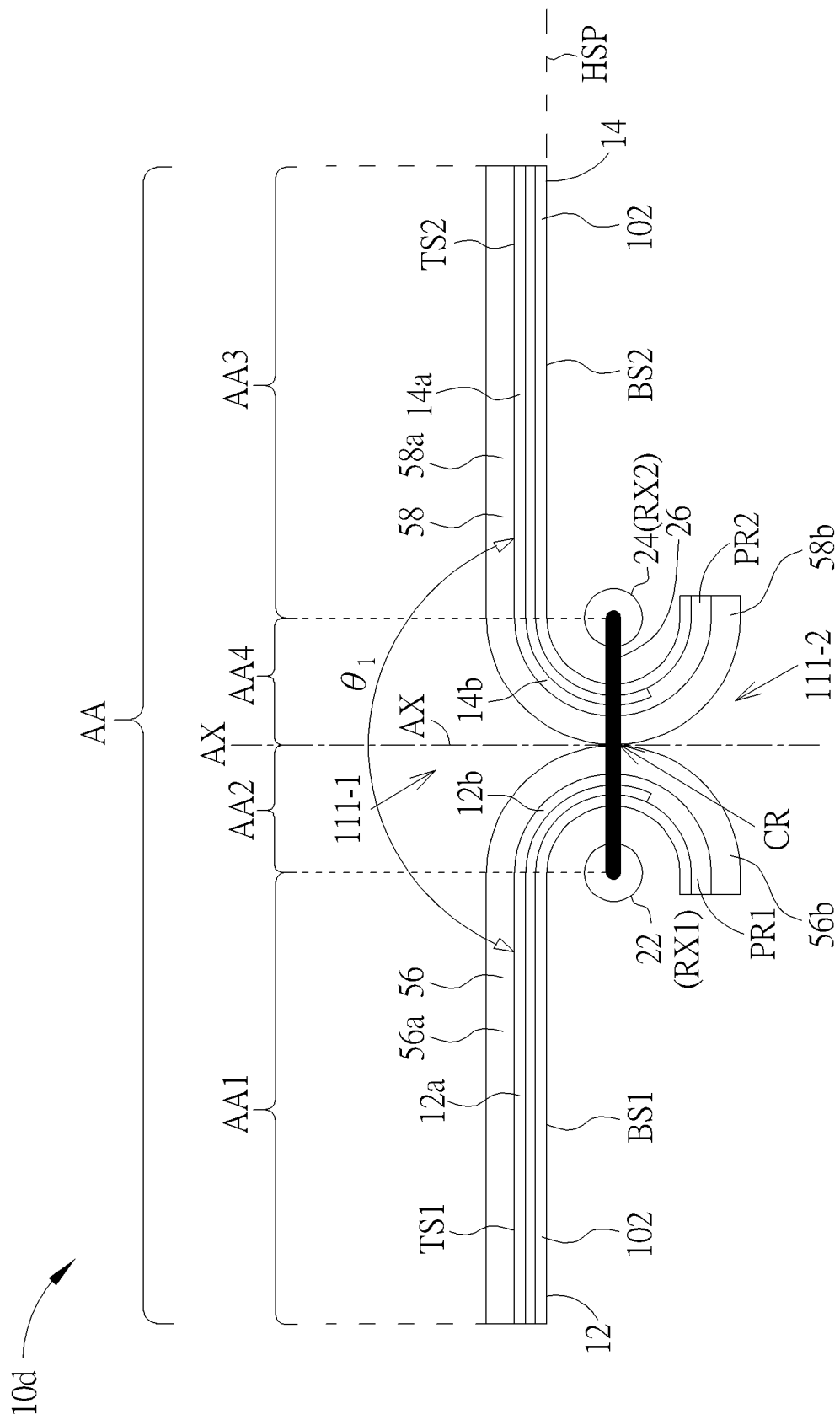
FIG. 10 is a partial cross-sectional view of a foldable display device in an unfolded form according to an embodiment of the present disclosure.

FIG. 10 is a partial cross-sectional view of a foldable display device 10d in an unfolded form according to an embodiment of the present disclosure. For example, the first flat portion 12a of the first panel 12 and the second flat portion 14a of the second panel 14 are substantially disposed on the same horizontal plane HSP, or the included angle θ1 between the display surface TS1 and the display surface TS2 is approximately 180±10 degrees. The difference between the display device 10d in FIG. 10 and the display device 10 in FIG. 3 is that, the first cover layer 56 on the first panel 12 and the second cover layer 58 on the second panel 14 are made of organic material, including polymers such as polyimide (PI), polyethylene naphthalate (PEN), polyethylene terephthalate (PET) or a combination thereof. In some embodiments, the first cover layer 56 may have a uniform thickness over the first display area AA1 and the second display area AA2 of the first panel 12. Optionally, the first cover layer 56 may extend to cover at least part of the first peripheral area PR1 of the first panel 12. Similarly, the second cover layer 58 may have a uniform thickness over the third display area AA3 and the fourth display area AA4 of the second panel 14. Optionally, the second cover layer 58 may extend to cover at least part of the second peripheral area PR2 of the second panel 14. The first cover layer 56 and the second cover layer 58 may contact with each other on the contact region CR. In some embodiments, the first cover layer 56 disposed on the first panel 12 and the second cover layer 58 disposed on the second panel may have curved structures, respectively. For example, the first cover layer 56 may have a planar portion 56a corresponding to the first display area AA1 and a curved portion 56b corresponding to the second display area AA2. The second cover layer 58 may have a planar portion 58a corresponding to the third display area AA3 and a curved portion 58b corresponding to the fourth display area AA4. The recess 111-1 shown in FIG. 10 is formed by the curved portion 56b of the first cover layer 56 and the curved portion 58b of the second cover layer 58. The recess 111-2 can be formed by the curved portion 56b of the first cover layer 56 and the curved portion 58b of the second cover layer 58.

According to an embodiment, the foldable display device 10d may compensate the image distortion shown in the second display area AA2 and the fourth display area AA4 caused by the first bending portion 12b and the second bending portion 14b by pixel compensation. For example, the amount of the pixel compensation may be calculated based on the curvature radius R1 of the first bending portion 12b and the curvature radius R2 of the second bending portion 14b. Thus, the sense of image discontinuity or splicing boundary between the second display area AA2 and the fourth display area AA4 can be reduced.

In light of the above, according to some embodiments, the foldable display device can be changed between the folded form and the unfolded form by rotating the first panel and the second panel around the first bending axis (the first axis assembly) and the second bending axis (the second axis assembly), respectively. In this way, defects caused by repeatedly folding or bending the first panel itself and/or the second panel itself may be reduced. Therefore, the foldable display device may have improved stability and reliability. In addition, according to some embodiments, the cover layers with curved portions can provide optical compensations to the bending portions of the first panel and the second panel, the sense of image discontinuity or splicing boundary may be reduced, so that an expanded display area may be obtained.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A foldable display device, comprising:
   a first panel comprising a first flat portion and a first bending portion at one side of the first flat portion, wherein the first bending portion has a first bending axis and the first bending portion is capable of rotating around the first bending axis;
   a first cover layer disposed on the first panel, the first cover layer comprising:
      a first planar portion corresponding to the first flat portion; and
      a first curved portion corresponding to the first bending portion;
   a second panel comprising a second flat portion and a second bending portion at one side of the second flat portion, wherein the second bending portion has a second bending axis and the second bending portion is capable of rotating around the second bending axis; and
   a second cover layer disposed on the second panel, the second cover layer comprising:
      a second planar portion corresponding to the second flat portion; and
      a second curved portion corresponding to the second bending portion,
   wherein the first bending portion and the second bending portion are disposed adjacent to each other.

2. The foldable display device according to claim 1, wherein the first curved portion of the first cover layer covers along the first bending portion, the second curved portion of the second cover layer covers along the second bending portion, wherein the first curved portion and the second curved portion contact with each other continuously when the first bending portion and the second bending portion relatively rotate.

3. The foldable display device according to claim 1, further comprising:
   a first light guiding body disposed between the first bending portion of the first panel and the first curved portion of the first cover layer; and
   a second light guiding body disposed between the second bending portion of the second panel and the second curved portion of the second cover layer,
   wherein the first curved portion and the second curved portion contact with each other and a sidewall of the first light guiding body and a sidewall of the second light guiding body contact with each other when the first flat portion of the first panel and the second flat portion of the second panel are unfolded to be on a same horizontal level.

4. The foldable display device according to claim 1, further comprising a recess formed by the first curved portion of the first cover layer and the second curved portion of the second cover layer.

5. The foldable display device according to claim 4, further comprising another recess, wherein from a top view, the another recess is between the first bending portion of the first panel and the second bending portion of the second panel, and the recess is opposite to the another recess.

6. The foldable display device according to claim 1, wherein:
   the first panel comprises a first display area corresponding to the first flat portion and a second display area corresponding to the first bending portion; and
   the second panel comprises a third display area corresponding to the second flat portion and a fourth display area corresponding to the second bending portion,
   wherein the second display area and the fourth display area are adjacent and joined to constitute an expanded display area with the first display area and the third display area when an included angle between the first flat portion of the first panel and the second flat portion of the second panel is between 170 degrees and 190 degrees.

7. The foldable display device according to claim 1, wherein:
   the first panel comprises a first supporting layer, a first flexible substrate disposed on the first supporting layer, and a first display device layer disposed on the first flexible substrate; and
   the second panel comprises a second supporting layer, a second flexible substrate disposed on the second supporting layer, and a second display device layer disposed on the second flexible substrate.

8. The foldable display device according to claim 7, wherein the first display device layer extends into a portion of the first bending portion, and the second display device layer extends into a portion of the second bending portion.

9. A foldable display device, comprising:
   a first panel comprising a first flat portion and a first bending portion at one side of the first flat portion, wherein the first bending portion has a first bending axis and the first bending portion is capable of rotating around the first bending axis;
   a second panel comprising a second flat portion and a second bending portion at one side of the second flat portion, wherein the second bending portion has a second bending axis and the second bending portion is capable of rotating around the second bending axis, wherein the first bending portion and the second bending portion are disposed adjacent to each other; and
   a connecting element to dispose the first bending portion and the second bending portion oppositely and to dispose the first bending portion and the second bending portion between the first flat portion and the second flat portion.

10. The foldable display device according to claim 9, further comprising:
   a first axis assembly; and
   a second axis assembly,
   wherein the connecting element extends from a side of the first bending portion through the first bending portion and the second bending portion to a side of the second bending portion to connect the first axis assembly and the second axis assembly.

11. The foldable display device according to claim 9, wherein the first panel comprises a first display area corresponding to the first flat portion, and the second panel comprises a third display area corresponding to the second flat portion, and wherein the first display area is positioned on a side of the first panel opposite to the connecting element, the third display area is positioned on a side of the second panel opposite to the connecting element by relatively rotating the first bending portion and the second bending portion outwardly.

12. The foldable display device according to claim 9, wherein the first panel comprises a first display area corresponding to the first flat portion, and the second panel comprises a third display area corresponding to the second flat portion, and wherein the first display area and the third display area are face-to-face overlapped by relatively rotating the first bending portion and the second bending portion inwardly.

\* \* \* \* \*